Feb. 2, 1954 R. J. CARBARY 2,668,092
MOUNTING ARRANGEMENT FOR STORAGE RECEPTACLES
Filed Aug. 31, 1950 3 Sheets-Sheet 1
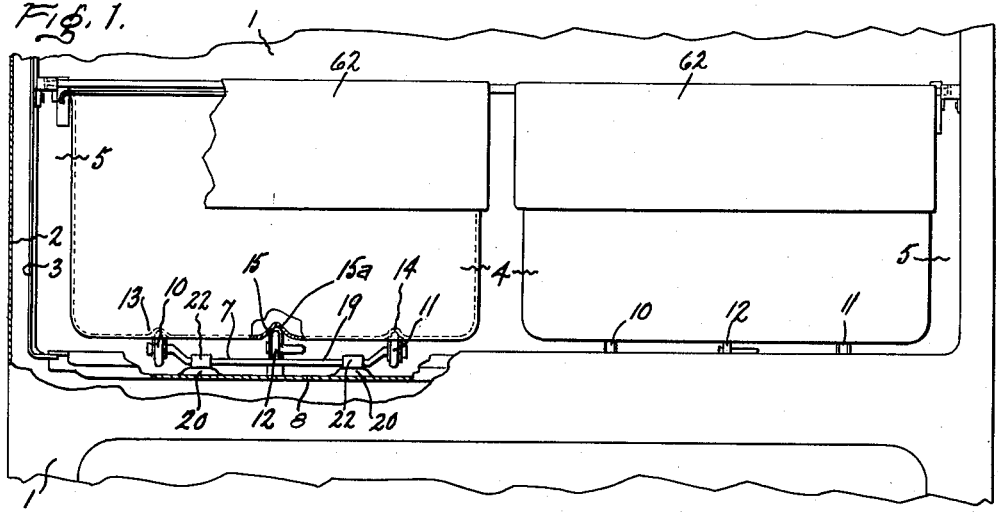
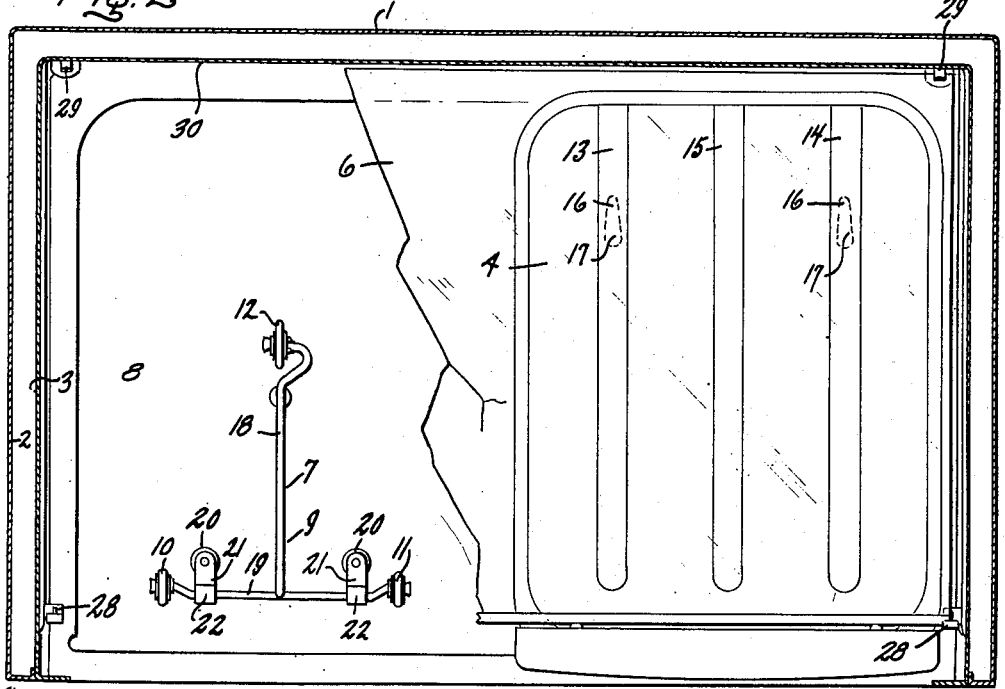
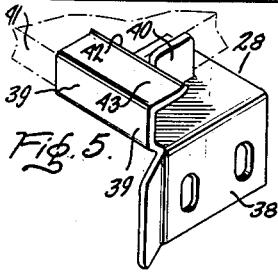
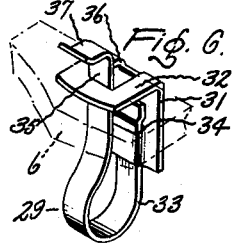
Inventor
Richard J. Carbary,
by William G. Edwards, Jr.
His Attorney.

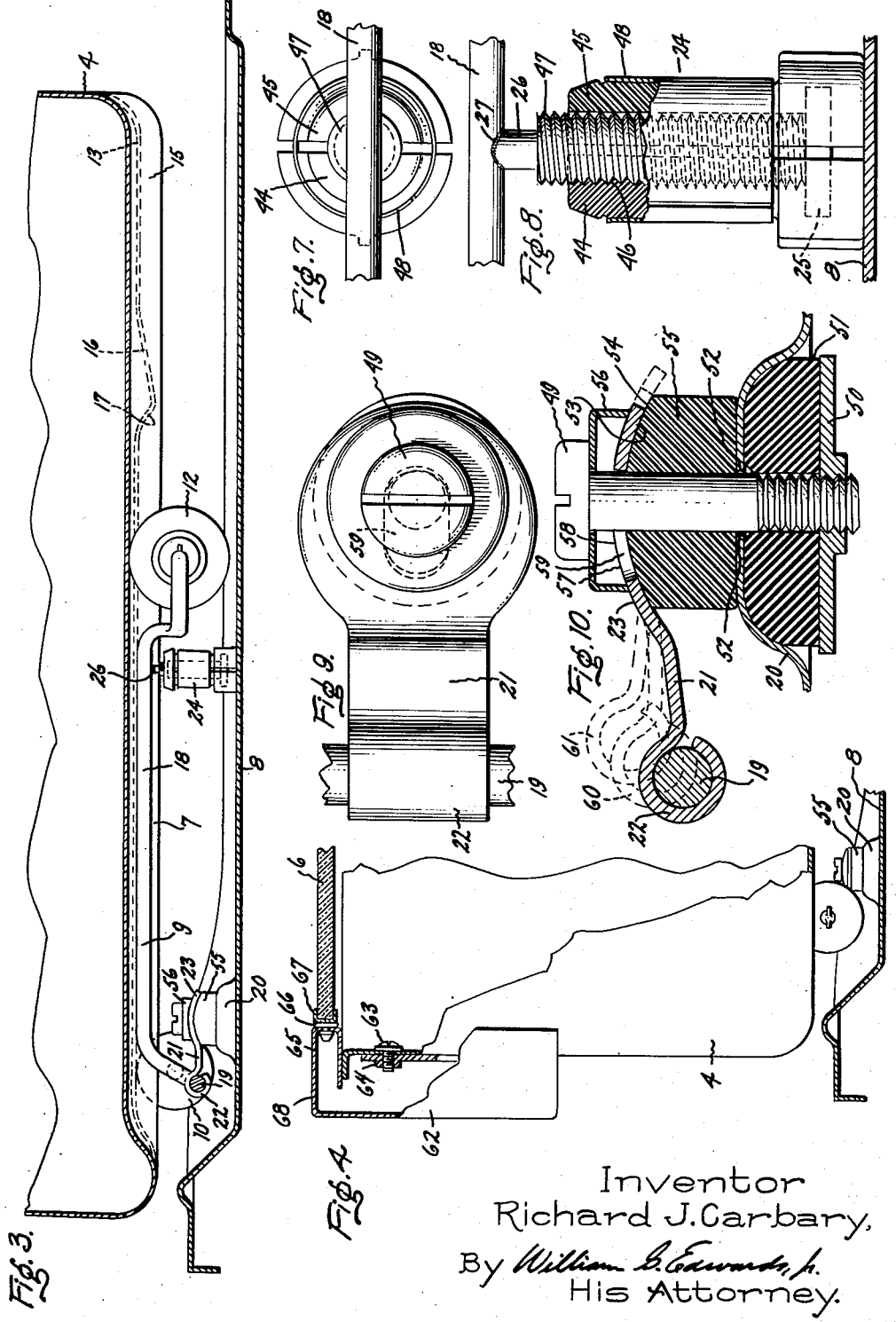

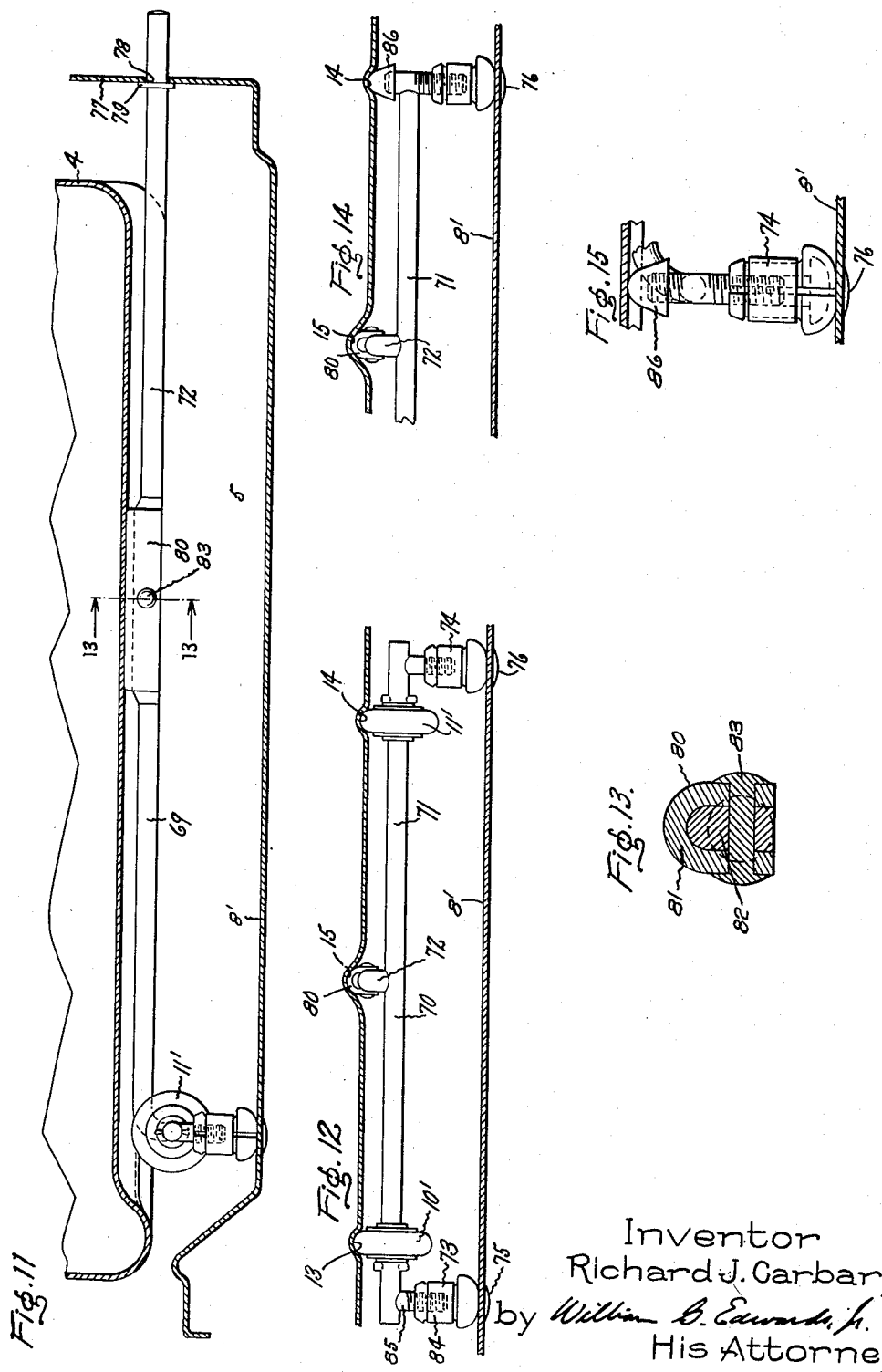

Patented Feb. 2, 1954

2,668,092

UNITED STATES PATENT OFFICE 2,668,092

MOUNTING ARRANGEMENT FOR STORAGE RECEPTACLES

Richard J. Carbary, Erie, Pa., assignor to General Electric Company, a corporation of New York Application August 31, 1950, Serial No. 182,489

18 Claims. (Cl. 312—270)

My invention relates to arrangements for slidably mounting storage receptacles, and particularly food storage receptacles for refrigerators.

In many refrigerators covered receptacles are supplied to provide high humidity conditions desirable for preservation of vegetables and the like. Generally, frames are mounted on the bottom of the food storage compartment of the refrigerator and the food storage receptacles are slidably suspended on these frames. Such arrangements have the disadvantage that a flange on the receptacle rides in a channel on the frame and moisture collecting in the channel and on the flange tends to cause corrosion of the flange. Also, the receptacle may be somewhat difficult to move when heavily loaded. By my arrangement the food storage receptacles are mounted on rollers or other supporting members positioned at the bottom of the food storage compartment so that easy movement of the receptacles is facilitated and, because of the elimination of the sliding engagement of the flange of the food storage receptacle and the channel of the supporting frame, the rusting of the flange is minimized. Further, parallel grooves formed in the bottom of the food storage receptacle are arranged to cooperate with the rollers or members so that these members guide the food storage receptacle during movement for access thereto.

It is an object of my invention to provide an improved arrangement for supporting storage receptacles whereby the easy movement of the receptacle for access thereto is facilitated.

It is another object of my invention to provide an improved arrangement for guiding storage receptacles during movement for access thereto.

It is a further object of my invention to provide an improved arrangement for adjustably supporting a food storage receptacle for refrigerators so as to permit variation of the temperature and humidity conditions therein.

It is still another object of my invention to provide a refrigerator including a storage receptacle and a cover therefor and including an improved arrangement for adjustably supporting the food storage receptacle to vary the distance between the top of the receptacle and the cover.

It is still a further object of my invention to provide a refrigerator including a storage receptacle and a cover therefor and including an improved arrangement for affording adjustment of the position of the food storage receptacle for alignment with the cover.

It is still another object of my invention to provide an arrangement for movably supporting a storage receptacle including an improved arrangement for limiting the forward movement of the receptacle.

Further objects and advantages of my invention will become apparent as the following description proceeds and the features of novelty which characterize my invention will be pointed out with particularity in the claims annexed to and forming part of this specification.

While the mounting arrangements of my invention may be employed in many applications where sliding or rolling movement of a receptacle is desired, for purposes of illustration I have shown my invention applied to food storage receptacles for household refrigerators. In carrying out the objects of my invention, a rack having a plurality of rollers or other upwardly extending supporting members thereon is disposed at the bottom of the liner which defines a food storage compartment. A food storage receptacle is formed with a plurality of parallel grooves therein, each of the grooves being adapted to receive one of the supporting members whereby the members facilitate movement of the receptacle and guide the receptacle during this movement. In one form an adjustable foot is provided at the rear portion of the rack for varying the position of the rear portion of the food storage receptacle with respect to its cover and to the bottom of the liner, thereby varying the temperature and humidity conditions in the receptacle. The forward supports for the rack are arranged to permit adjustment of the rack so as to align the top of the food storage receptacle with its cover and to raise or lower the forward portion of the receptacle. One or more of the grooves are shaped to provide stops for engaging a corresponding roller or member to limit the forward movement of the receptacle.

For a better understanding of my invention, reference may be had to the accompanying drawings in which Fig. 1 is an elevation view, partly broken away, of a portion of a refrigerator incorporating an embodiment of my food storage receptacle arrangement; Fig. 2 is a plan view partly broken away of the structure shown in Fig. 1, with one of the food storage receptacles removed; Fig. 3 is an enlarged side view showing details of the structure; Fig. 4 is another enlarged side view illustrating the relationship between the receptacle and its cover; Figs. 5 and 6 illustrate details of the cover supporting and locking arrangement; Figs. 7 and 8 are top and elevation views respectively showing the height-adjusting feature of the rear portion of the rack; Figs. 9 and 10 are top and elevation views respectively of adjustable elements at the forward portions of the rack; Fig. 11 is a side elevation view of a modified form of my invention; Fig. 12 is a front elevation view of the form shown in Fig. 11; Fig. 13 is a view taken along the line 13—13 in Fig. 11; Fig. 14 is a front elevation view of another modified form of my invention; and Fig. 15 is an enlarged side elevation view of a portion of the form shown in Fig. 14.

Referring now to Figs. 1, 2 and 3, there is shown a portion of a refrigerator 1 including an outer metal wall 2 and an inner wall or liner 3. Two food storage receptacles 4 are positioned in the bottom portion of the food storage compartment 5 which is defined by the liner 3. A stationary cover 6 of glass or similar material is provided above the tops of the food storage receptacles for maintaining high humidity conditions therein suitable for the proper preservation of vegetables and the like.

In order to provide for movement of each of the food storage receptacles forwardly of the position shown to permit access to the contents thereof, each is mounted for sliding or rolling movement on a rack 7 disposed adjacent the bottom 8 of the liner 3 of the food storage compartment. The rack 7 includes a T-shaped frame 9 having a plurality of members or rollers 10, 11 and 12 at the extremities of the frame, and the food storage receptacles 4 ride on these rollers. In order to guide the food storage receptacle during movement to and from the closed position, each of the receptacles 4 is provided with the plurality of grooves 13, 14 and 15 for receiving the corresponding rollers 10, 11 and 12, respectively. The food storage receptacle rides easily on the rollers and the cooperation between the rollers and the grooves in the receptacle guides the receptacle during movement. In order to limit the forward movement of the food storage receptacle, each of the outer two grooves 13 and 14 is provided with a depression 16 formed therein to provide a stop 17 for engaging its corresponding roller. These stops prevent the food storage receptacle 4 from being accidentally pulled all the way from the food storage compartment. If it is desired to remove the receptacle for cleaning or the like, the receptacle may be deliberately raised slightly to move the depression 16 above the tops of the corresponding rollers.

Referring now to details of the rack mounting arrangement, as illustrated in Figs. 1, 2 and 3, it can be seen that the rack 7 includes, as mentioned previously, a T-shaped frame 9. The T-shaped frame includes a rod or leg 18 extending perpendicularly to the front of the food storage compartment and lengthwise of the food storage receptacle 4. The frame further includes a second rod or leg 19 extending transversely of the first rod 18 at the forward end thereof and positioned at the forward portion of the food storage compartment 5, the rod 18 being secured to the rod 19 at the midpoint of the rod 19. Rollers 10 and 11 are rotatably mounted at the two extremities of the transverse rod 19, and the roller 12 is rotatably mounted at the rear extremity of the rod 18, the roller 12 being disposed on a line extending generally midway between rollers 10 and 11. In order to provide a mounting for the forward portion of the rack, the bottom 8 of the liner 3 is provided with two raised portions 20 beneath each of the food storage receptacles at the forward portion of the food storage compartment. The rack 7 includes two elements 21, each of which includes a loop 22 encircling and secured to the rod 19 and a curved or spherical portion 23 adapted to mount the rack on the raised portions 20 of the liner. While the portion 23 is preferably spherical, that is, formed as part of a spherical surface, it is at least curved in a plane extending perpendicularly to the leg 19 of the frame. As shown in Figs. 1 and 3, the mounting of the forward portion of the rack is such that the rollers 10 and 11 are spaced above the bottom 8 of the liner. A foot 24 is provided for supporting the rear portion of the rack and for maintaining the rear roller 12 above the bottom 8 of the liner. The foot 24 has a portion 25 adapted to rest on the bottom 8 of the liner which is mounted on the frame by a rod 26 welded or otherwise secured, as indicated at 27, to the rod 18.

It should be noted that the leg 18 of the rack is of such height that it lies within the central groove 15. By this arrangement this leg 18 guides the receptacle during rearward movement prior to the time when the back of the receptacle reaches the roller 12. The leg 18 of the rack, therefore, prevents the receptacle from becoming askew during insertion into the food storage compartment and insures that the receptacle is properly aligned for receiving the roller 12 within the central groove 15 as the receptacle is moved rearwardly in the food storage compartment. It should be further noted (see Fig. 1) that the height of the leg 18 is such that the distance between the leg 18 and the cover 6 is less than the distance between the top and the bottom of the receptacle, that is, the height of the receptacle, but is greater than the distance between the top of the receptacle and the bottom 15a of the groove 15. Hence, the leg 18 insures that the receptacle is inserted in the correct position transversely of the food storage compartment because the relationship between the height of the receptacle and the distance between the leg 18 and the cover 6 is such that the receptacle cannot be inserted unless the leg 18 is aligned with the central groove 15.

As mentioned previously, the glass cover 6 is fixed in position. As indicated in Figs. 2, 5 and 6, this cover is supported by two supports 28 secured to the sides of the liner 3 near the forward end thereof and two supports 29 mounted on the rear wall 30 of the liner near the opposite sides thereof. In order to removably lock the cover in position, each of the rear supports 29 includes an L-shaped bracket 31 which is secured to the rear wall 30 of the liner. This bracket includes a horizontal leg 32 upon which the rear edge of the glass cover 6 is supported. A generally U-shaped resilient element 33 is mounted in a slot 34 in the bracket 31 and includes a leg 35 extending upwardly through a slot 36 in the bracket. The resilient leg 35 includes a forwardly extending horizontal element 37 which, in the assembled position of the cover, overlaps the rear edge of the cover and holds the rear edge in position. Each of the forward supports 28 includes a vertical portion 38 by which the support is secured to the side wall of the liner. Each support 28 further includes a rearwardly facing channel portion 39 which receives and overlaps the forward edge of the glass cover 6. An upwardly extending tab 40 limits the sidewise movement of the cover. The cover 6 may be easily removed by pushing the cover rearwardly, thereby moving the resilient leg 35 of the rear supporting bracket rearwardly, until the forward edge 41 of the cover clears the rear edge 42 of the channel 39. The forward edge of the cover may then be lifted and the cover removed. However, it will be apparent that, except for this deliberate removal, the cover is fixed in position and held against accidental upward movement by the overlapping portion 37 of the rear supports and the overlapping portion 43 of the channel 39 of the front supports. This fixed shelf is desirable since, when a food storage receptacle 4 is partially withdrawn from the food storage compartment, it tends to tilt downwardly at the forward portion, bringing the upper rear edge into engagement with the underside of the cover 6. In the absence of the fixed positioning of the cover, this tilting of a food storage receptacle would tend to displace the cover and allow the receptacle to slide out of the food storage compartment.

In order to provide for adjustment of the height of the rear portion of the food storage receptacle 4 so as to vary the spacing between the top of the receptacle and the cover 6 and between the bottom of the receptacle and the bottom 8 of the liner, an adjustable construction of the foot 24, illustrated in detail in Figs. 7 and 8, is provided. This adjustable construction includes two semi-cylindrical elements 44 and 45, each of which is composed of plastic or some similar material not having any tendency to scratch or mar the finish of the bottom of the liner 8. The element 44 is internally threaded, as indicated at 46, for threaded engagement with a threaded portion 47 of a section formed integral with the rod 26. The elements 44 and 45 are held in assembled relationship and the element 44 in threaded engagement with the portion 47 by a split cylindrical sleeve 48 formed of some resilient material so as to firmly grip the outer surface of the elements 44 and 45. It can be seen that the height of the rear portion of the food storage receptacle 4 can be adjusted by relative movement of the threaded portions 44 and 47. Lengthening of the foot 24 by turning the assembly, including the threaded element 44, effects a raising of the rear portion of the food storage receptacle and a resultant decrease in the spacing between the rear portion of the food storage receptacle and the cover 6, thereby decreasing air circulation within the receptacle and increasing the humidity therein. This adjustment concurrently increases the spacing between the bottom of the food storage receptacle and the bottom 8 of the liner, resulting in increased circulation through this space and a resultant decrease in the temperature within the food storage receptacle. The converse adjustment can be utilized to decrease humidity within the food storage receptacle and to increase the temperature therein.

In the mass production of articles such as refrigerators there may be some slight variations in the various elements making up the complete refrigerator cabinet. In order to improve the appearance of the completed structure it is desirable to provide for alignment of various elements, for example, the food storage receptacle and the cover utilized therewith, and to overcome any misalignment which might result from the variations referred to above. Provision for alignment of the food storage receptacle and the associated cover is provided for in my construction by the adjustable mounting of the forward supports of the rack 7. This construction is shown in detail in Figs. 9 and 10. Referring to these figures, it can be seen that the elements 21 of the rack 7 are mounted on the raised portions 20 of the bottom 8 of the liner by a screw 49 and a nut 50. A gasket 51 of resilient, compressible material, such as rubber, is received within the concave portion of the liner beneath the raised portions 20 and, when compressed, seals the opening 52 in the bottom of the liner. The curved portion 23 of the element 21 includes a curved or spherical surface 53 arranged to engage a similarly curved or spherical upper surface 54 of a washer or supporting element 55 which is mounted on the raised portion 20. A second washer 56 is arranged above the curved portion 23 of the element 21 and includes a surface 57 corresponding to the upper surface 58 of the portion 23. The screw 49 is tightened to hold the surfaces 54 and 57 in gripping engagement with the corresponding surfaces of the curved portion 23. In order to provide for adjusting the height of either end of the rod 19 of the frame 9 of the rack so as to raise or lower its corresponding roller 10 or 11, the curved portion 23 of the element 21 is provided with an elongated slot 59. To raise the height of a corresponding roller, the screw 49 is loosened and the element 21 is shifted from the solid line position shown in Fig. 10 to either of the dotted line positions indicated at 60 or 61. It can be seen that the raising of the element 21 also effects a raising of the corresponding end of the rod 19 and of the corresponding roller. This adjustment can therefore be used to raise, or conversely to lower, either side of the front portion of the food storage receptacle 4. For example, should the right-hand side of the food storage receptacle in Figs. 1 and 2 be found to be lower than the left-hand side with respect to the cover 6, the right-hand element 21 as viewed in Figs. 1 and 2 is raised by the adjustment indicated in detail in Fig. 10 to raise the roller 11 and thereby to raise the right-hand side of the food storage receptacle.

Referring to Fig. 4, it can be seen that the food storage receptacle 4 is provided with a handle 62 secured to the food storage receptacle by a screw 63 and nut 64 or other suitable fastening means. The handle 62 includes a channel-shaped section 65 at the top portion thereof and bumpers 66 of rubber or other suitable resilient material are mounted on the inner vertical face of this channel. These bumpers 66 engage the face of a metal channel element 67 which is fitted over the forward edge of the glass cover 6. By referring to Fig. 4, it can be seen that the provision of the adjustable devices at the forward portion of the rack makes it possible to align perfectly the top surface 68 of the handle of the food storage receptacle 4 and top surface of the cover 6, thus presenting a pleasing appearance in the finished product. While the forward mounting arrangement for the rack has been described above as being utilized for raising or lowering one side or the other of the receptacle to align the receptacle with the cover, it will be apparent that the adjustment provided can be employed also for raising or lowering the entire front portion of the pan for affecting the temperature and humidity conditions therein by adjusting both elements 21 to raise or lower both rollers 10, 11.

In Figs. 11, 12 and 13 there is shown a modified form of my invention in which the rack is of a modified construction and is supported in a different manner on the liner. The same numerals have been used to designate corresponding parts in Figs. 11 to 13 and in Figs. 1 to 10. Referring to Figs. 11 and 12, a rack 69, as in the form previously described, includes a T-shaped frame 70 having a horizontal leg 71 extending transversely of the food storage receptacle at the forward portion of the food storage compartment 5 and a second horizontal leg 72 extending rearwardly from the midpoint of the front leg 71. Two feet 73 and 74 are secured near the outer extremities of the front leg 71 and rest on the liner bottom 8' to support the forward portion of the rack 69. The bottom 8' of the liner is formed with depressions 75 and 76 for receiving the feet 73 and 74 respectively and thereby retaining the rack 69 against accidental movement relative to the liner 8'. The rear wall 77 of the liner is provided with an opening 78, and the rearwardly extending leg 72 of the rack is received in and extends through this opening 78 so that the rear portion of the rack is supported by the rear wall 77 of the liner. A shoulder 79 is formed on the leg 72 of the rack to limit the rearward movement.

As in the form previously described, the food storage receptacle 4 is formed to provide a plurality of parallel grooves 13, 14 and 15 for facilitating guiding of the receptacle during movement toward and from its position within the food storage compartment 5. Rollers 10' and 11' are mounted on the forward leg 71 of the rack near the outer ends thereof and these rollers are received within the grooves 13 and 14 respectively. On the rearwardly extending leg 72 of the rack there is provided a shoe or member 80 which is received within the central groove 15. The shoe 80 includes a receptacle-engaging element 81 which is formed of some material having a relatively high wear resistance and a relatively low coefficient of friction, such as any of a number of plastic materials. The element 81 is formed of U-shaped cross section and is secured to a flattened section 82 of the leg 72 by a rivet 83 or other suitable fastening device. As in the form previously described, the central groove 15 is made of greater depth than the grooves 13 and 14 and the leg 72 of the rack is arranged to extend partially into the space provided by the groove 15 so as to assist in guiding the food storage receptacle 4 during assembly within the cabinet prior to the time when the shoe 80 is received within the groove 15. Stops similar to stops 17 in the form of Figs. 1 to 10 may also be provided in the outer grooves 13 and 14 for limiting the forward movement of the receptacle.

In the form shown in Figs. 11, 12 and 13 the rear portion of the rack is supported at a definite height determined by the position of the opening 78 in the rear wall 77 of the liner, and accordingly the entire adjustment of the rack and of the food storage receptacle 4 is accomplished by use of the adjustable feet 73 and 74 at the forward end of the rack 69. These adjustable feet 73 aand 74 are of the same construction as that described and illustrated in detail in connection with Figs. 7 and 8, and the adjustment of the height of either side of the forward portion of the rack 69 is accomplished by screwing the threaded portion 84 of the adjustable foot relative to the threaded portion of the rod 85. By this arrangement the forward portion of the food storage receptacle may be raised or lowered to vary the temperature and humidity conditions within the receptacle and either side of the receptacle may be independently raised or lowered to align the receptacle with respect to the cover.

In Figs. 14 and 15 there is shown a modified form which differs from that shown in Figs. 11, 12 and 13 in that no rollers are employed at the forward portion of the rack. The same numerals have been used to designate corresponding parts in Figs. 11 to 13 and Figs. 14 and 15. In lieu of the rollers two members or studs are employed at the outer extremities of the forward horizontal leg 71 of the rack, one such member being indicated at 86. A shoe 80 is employed on the rearwardly extending leg 72. Adjustable feet corresponding to the feet 73 and 74 in the form of Figs. 11 and 12 are employed at the outer extremities of the leg 71 of the rack, only one such foot 74 being illustrated in Figs. 14 and 15. The raising and lowering of the forward portion of the food storage receptacle 4 and the aligning of this receptacle with its cover is accomplished by adjustment of the forward supporting feet in the same manner as previously described in connection with Figs. 11, 12, and 13. The members 86 are made of a suitable wear-resistant material of low coefficient of friction, such as any of a number of plastic materials. These members are made of the same material as that employed for the shoe 80. The food storage receptacle 4 is slid to and from its position within the food storage compartment 5 for access thereto and rides during sliding movement upon the two members 86, which are received within the grooves 13 and 14 of the receptacle, and the shoe 80 which is received within the groove 15.

Although three rollers have been shown and described as the receptacle supporting members in the form of Figs. 1–10, it will be apparent that supporting members such as those shown in Figs. 11 to 13 or in Figs. 14 and 15 could also be employed with the rack of Figs. 1 to 10. Conversely, the three-roller arrangement of Figs. 1 to 10 could be utilized, if desired, with the racks of Figs. 11 to 15.

While I have shown and described specific embodiments of my invention as applied to food storage receptacles for refrigerators, other applications and modifications will occur to those skilled in the art and I intend, by the appended claims, to cover all modifications within the spirit and scope of my invention.

What I claim as new and desire to secure by Letters Patent of the United States is:

1. A rack and receptacle assembly comprising a storage receptacle and a supporting rack for facilitating movement of said receptacle, said rack including a T-shaped frame having a first leg extending transversely of said receptacle and a second leg extending perpendicularly to said first leg, said rack being disposed adjacent the forward portion of said receptacle, said rack having three rollers mounted thereon for slidably supporting said receptacle, said receptacle having three parallel grooves formed therein, each of said rollers being received within a corresponding one of said grooves whereby said rollers cooperate with said grooves to guide said receptacle during sliding movement, at least one of said grooves being shaped to provide a stop for engaging its corresponding roller to limit the forward movement of said receptacle, said second leg of said frame being received within one of said grooves for guiding said receptacle.

2. A rack and receptacle assembly comprising a storage receptacle, a supporting rack for facilitating movement of said receptacle, said rack including a T-shaped frame having a first leg extending transversely of said receptacle and a second leg extending perpendicularly to said first leg, said rack being disposed adjacent the forward portion of said receptacle, and three members mounted on said frame for slidably supporting said receptacle, each of said members being mounted at a corresponding one of the extremities of said frame, said receptacle having three parallel grooves formed therein, each of said members being received within a corresponding one of said grooves whereby said members cooperate with said grooves to guide said receptacle during sliding movement, at least one of said grooves being shaped to provide a stop for engaging its corresponding member to limit the forward movement of said receptacle, said second leg of said frame being received within one of said grooves for guiding said receptacle.

3. A refrigerator or the like including a liner defining a food storage compartment, a food storage receptacle within said compartment, and means including a rack for facilitating movement of said receptacle, the bottom of said liner being formed with two raised portions thereon, said rack including a T-shaped frame having a first leg extending transversely of said receptacle at the forward portion thereof and a second leg extending rearwardly from said first leg, said rack including two elements each secured to a corresponding one of said raised portions for supporting said rack, said rack having three members mounted thereon for slidably supporting said receptacle, said receptacle having three parallel grooves formed therein, each of said members being received within a corresponding one of said grooves whereby said members cooperate with said grooves to guide said receptacle during sliding movement, at least one of said grooves being shaped to provide a stop for engaging its corresponding member to limit the forward movement of said receptacle, said second leg of said frame being received within one of said grooves for guiding said receptacle.

4. A rack and receptacle assembly comprising a storage receptacle and a supporting rack for facilitating movement of said receptacle, said rack including a T-shaped frame having a first leg extending transversely of said receptacle and a second leg extending perpendicularly to said first leg, said rack being disposed adjacent the forward portion of said receptacle, said rack having three members mounted thereon for slidably supporting said receptacle, said receptacle having three parallel grooves formed therein, each of said members being received within a corresponding one of said grooves whereby said members cooperate with said grooves to guide said receptacle during sliding movement, at least one of said grooves being shaped to provide a stop for engaging its corresponding member to limit the forward movement of said receptacle, said second leg of said frame being received within one of said grooves for guiding said receptacle.

5. A rack and receptacle assembly comprising a storage receptacle and a supporting rack for facilitating movement of said receptacle, said rack including a T-shaped frame having a first leg extending transversely of said receptacle and a second leg extending perpendicularly to said first leg, said rack being disposed adjacent the forward portion of said receptacle, said rack having two members mounted thereon in spaced relationship at the forward portion thereof for slidably supporting said receptacle, said rack having a third member mounted thereon rearwardly of said first two members and disposed on a line generally midway between said first two members for slidably supporting said receptacle, said receptacle having three parallel grooves therein, each of said members being received within a corresponding one of said grooves whereby said members cooperate with said grooves to guide said receptacle during sliding movement, said first two members being received within the outer two of said grooves, each of said outer two grooves being shaped to provide a stop for engaging its corresponding one of said first two members to limit the forward movement of said receptacle, said second leg of said frame being received within one of said grooves for guiding said receptacle.

6. A refrigerator or the like including a liner defining a food storage compartment, a food storage receptacle within said compartment, a cover fixedly mounted within said compartment in spaced relationship with the top of said receptacle, means including a rack disposed at the bottom of said liner for facilitating movement of said receptacle, said rack including a T-shaped frame having a first leg extending transversely of said receptacle at the forward portion thereof and a second leg extending rearwardly from said first leg, said rack including three members for slidably supporting said receptacle, said receptacle having three parallel grooves formed therein, each of said members being received within a corresponding one of said grooves whereby said members cooperate with said grooves to guide said receptacle during sliding movement, said second leg of said frame being received within one of said grooves for guiding said receptacle, and means for adjustably supporting the rear portion of said rack on the bottom of said liner whereby the height of said rack and the spacing of the rear portion of said receptacle from said cover may be varied.

7. A refrigerator or the like including a liner defining a food storage compartment, a food storage receptacle within said compartment, a cover fixedly mounted within said compartment in spaced relationship with the top of said receptacle, means including a rack disposed at the bottom of said liner for facilitating movement of said receptacle, said rack including a T-shaped frame having a first leg extending transversely of said receptacle at the forward portion thereof and a second leg extending rearwardly from said first leg, said rack including three members for slidably supporting said receptacle, said receptacle having three parallel grooves formed therein, each of said members being received within a corresponding one of said grooves whereby said members cooperate with said grooves to guide said receptacle during sliding movement, said second leg of said frame being received within one of said grooves for guiding said receptacle, said rack including a foot at the rear portion thereof adapted to rest on the bottom of said liner, and means for adjusting the length of said foot for varying the height of said rear portion of said rack whereby the spacing between the rear portion of said receptacle and said cover may be varied.

8. A refrigerator or the like including a liner defining a food storage compartment, a food storage receptacle within said compartment, a cover fixedly mounted within said compartment in spaced relationship with the top of said receptacle, means including a rack disposed at the bottom of said liner for facilitating movement of said receptacle, said rack including a T-shaped frame having a first leg extending transversely of said receptacle at the forward portion thereof and a second leg extending rearwardly from said first leg, said rack including three members for slidably supporting said receptacle, said receptacle having three parallel grooves formed therein, each of said members being received within a corresponding one of said grooves whereby said members cooperate with said grooves to guide said receptacle during sliding movement, said second leg of said frame being received within one of said grooves for guiding said receptacle, said rack including a foot at the rear portion thereof adapted to rest on the bottom of said liner, said foot including two cooperating threaded elements for affording adjustment of the length of said foot to vary the height of the rear portion of said rack whereby the spacing between the rear portion of said receptacle and said cover may be varied.

9. A refrigerator or the like including a liner defining a food storage compartment, a food storage receptacle within said compartment, a cover fixedly mounted within said compartment in spaced relationship with the top of said receptacle, means including a rack disposed at the bottom of said liner for facilitating movement of said receptacle, said rack including a T-shaped frame having a first leg extending transversely of said receptacle at the forward portion thereof and a second leg extending rearwardly from said first leg, said rack including three members for slidably supporting said receptacle, said receptacle having three parallel grooves formed therein, each of said members being received within a corresponding one of said grooves whereby said members cooperate with said grooves to guide said receptacle during sliding movement, said second leg of said frame being received within one of said grooves for guiding said receptacle, said rack including a foot at the rear portion thereof adapted to rest on the bottom of said liner, said foot including a threaded rod and two semi-cylindrical elements, at least one of said elements being threaded for engagement with said threaded rod, and a resilient sleeve encircling said elements to hold said elements in engagement with said threaded rod, said threaded element and threaded rod cooperating to afford adjustment of the length of said foot for varying the height of the rear portion of said rack whereby the spacing between the rear portion of said receptacle and cover may be varied.

10. A refrigerator or the like including a liner defining a food storage compartment, a food storage receptacle within said compartment, a cover fixedly mounted within said compartment in spaced relationship with the top of said receptacle, means including a rack disposed at the bottom of said liner for facilitating movement of said receptacle, said rack including a T-shaped frame having a first leg extending transversely of said receptacle at the forward portion of said compartment and a second leg extending rearwardly from the mid-point of said first leg, said rack including two members mounted at the two extremities of said first leg and a third member mounted at the rear extremity of said second leg for slidability supporting said receptacle, said receptacle having three parallel grooves formed therein, each of said members being received within a corresponding one of said grooves whereby said members cooperate with said grooves to guide said receptacle during sliding movement, said second leg of said frame being received within one of said grooves for guiding said receptacle, two elements secured to said first leg near opposite extremities thereof and extending perpendicularly to said first leg, two supporting elements mounted on the bottom of said liner, said first-named elements and said supporting elements having engaging surfaces curved in a plane extending perpendicularly to said first leg, each of said curved surfaces of said first-named elements including an elongated slot extending perpendicularly to said first leg whereby either of said elements may be moved for varying the height of its corresponding end of said first leg to adjust said receptacle relative to said cover, and means for locking said first-named elements in adjusted position.

11. A refrigerator or the like including a liner defining a food storage compartment, a food storage receptacle within said compartment, a cover fixedly mounted within said compartment in spaced relationship with the top of said receptacle, means including a rack disposed at the bottom of said liner for facilitating movement of said receptacle, said rack including a T-shaped frame having a first leg extending transversely of said receptacle at the forward portion of said compartment and a second leg extending rearwardly from the midpoint of said first leg, said rack including two members mounted at the two extremities of said first leg and a third member mounted at the rear extremity of said second leg for slidably supporting said receptacle, said receptacle having three parallel grooves formed therein, each of said members being received within a corresponding one of said grooves whereby said members cooperate with said grooves to guide said receptacle during sliding movement, said second leg of said frame being received within one of said grooves for guiding said receptacle, two elements secured to said first leg on opposite sides of said midpoint and extending perpendicularly to said first leg, two supporting elements mounted on said bottom of said liner, said first-named element and said supporting elements having spherical engaging surfaces, each of said spherical surfaces of said first-named elements including an elongated slot extending perpendicularly to said first leg whereby either of said elements may be moved for varying the height of its corresponding end of said first leg to adjust said receptacle relative to said cover, and means for locking said first-named element in adjusted position.

12. A refrigerator or the like including a liner defining a food storage compartment, a food storage receptacle within said compartment, a cover fixedly mounted within said compartment in spaced relationship with the top of said receptacle, means including a rack disposed at the bottom of said liner for facilitating movement of said receptacle, said rack including a T-shaped frame having a first leg extending transversely of said receptacle at the forward portion of said compartment and a second leg extending rearwardly from the midpoint of said first leg, said rack including two members mounted at the two extremities of said first leg and a third member mounted at the rear extremity of said second leg for slidably supporting said receptacle, said receptacle having three parallel grooves formed therein, each of said members being received within a corresponding one of said grooves whereby said members cooperate with said grooves to guide said receptacle during sliding movement, said second leg of said frame being received within one of said grooves for guiding said receptacle, two elements secured to said first leg on opposite sides of said midpoint and extending generally horizontally and perpendicularly to said first leg, two raised portions formed on the bottom of said liner, two washers mounted on said raised portions, said elements and said washers having spherical engaging surfaces, each of said spherical surfaces of said elements including an elongated slot extending perpendicularly to said first leg whereby either of said elements may be moved for varying the height of its corresponding end of said first leg to adjust said receptacle relative to said cover, and a screw extending through each of said slots for locking said first-named elements in adjusted position.

13. A rack and receptacle assembly comprising a storage receptacle and a supporting rack for facilitating movement of said receptacle, said rack including a T-shaped frame having a first leg extending transversely of said receptacle at the forward portion thereof and a second leg extending rearwardly from said first leg, said rack having three members mounted thereon for slidably supporting said receptacle, said receptacle having three parallel grooves formed therein, each of said members being received within a corresponding one of said grooves whereby said members cooperate with said grooves to guide said receptacle during sliding movement, said second leg of said frame being received within one of said grooves for guiding said receptacle.

14. A refrigerator or the like including a liner having a food storage compartment, a food storage receptacle within said compartment, a cover fixedly mounted within said compartment in spaced relationship to the top of said receptacle, means including a rack disposed at the bottom of said liner for facilitating movement of said receptacle, said rack including a T-shaped frame having a first leg extending transversely of said receptacle at the forward portion of said compartment and a second leg extending rearwardly from said first leg, said rack having three members mounted thereon for slidably supporting said receptacle, said receptacle having three parallel grooves formed therein, each of said members being received within a corresponding one of said grooves whereby said members cooperate with said grooves to guide said receptacle during sliding movement, the distance between said second leg and said cover being greater than the distance between the corresponding one of said grooves and the top of said receptacle and less than the height of said receptacle whereby said receptacle may be inserted within said compartment only when said second leg is in line with said one of said grooves.

15. A refrigerator or the like including a liner defining a food storage compartment, a food storage receptacle within said compartment, and means including a unitary supporting rack disposed at the bottom of said liner for facilitating movement of said receptacle, said rack having two spaced feet at the forward portion thereof for resting on the bottom of said liner to support the forward portion of said rack said bottom of said liner having two depressions formed therein for receiving said feet, said feet being received in said depressions but being free of attachment to said bottom of said liner, said liner having an opening in the rear wall thereof, said rack including a single leg extending through said opening for supporting the rear portion of said rack, said rack being removable as a unit from said compartment, said rack having a plurality of members mounted thereon for slidably supporting said receptacle, said receptacle having a plurality of parallel grooves formed therein, each of said members being received within a corresponding one of said grooves whereby said members cooperate with said grooves to guide said receptacle during sliding movement.

16. A refrigerator or the like including a liner defining a food storage compartment, a food storage receptacle within said compartment, and means including a unitary rack disposed at the bottom of said liner for facilitating movement of said receptacle, said rack having two spaced feet at the forward portion thereof for resting on the bottom of said liner to support the forward portion of said rack, said bottom of said liner having two depressions formed therein for receiving said feet, said feet being received in said depressions but being free of attachment to said bottom of said liner, said liner having an opening in the rear wall thereof, said rack including a unitary leg extending through said opening for supporting the rear portion of said rack, said rack being removable as a unit from said compartment, said rack having a plurality of members mounted thereon for slidably supporting said receptacle, said receptacle having a plurality of parallel grooves formed therein, each of said members being received within a corresponding one of said grooves whereby said members cooperate with said grooves to guide said receptacle during sliding movement, and means for adjusting the length of each of said feet to vary the position of said receptacle.

17. A refrigerator or the like including a liner defining a food storage compartment, a food storage receptacle within said compartment, and means including a rack disposed at the bottom of said liner for facilitating movement of said receptacle, said rack including a T-shaped frame having a first leg extending transversely of said receptacle at the forward portion of said compartment and a second leg extending rearwardly from the midpoint of said first leg, said rack having two feet mounted on said first leg on opposite sides of said midpoint and resting on the bottom of said liner to support the forward portion of said rack, said rack including two members mounted adjacent the two extremities of said first leg for slidably supporting said receptacle, said liner having an opening in the rear wall thereof, said second leg of said rack extending through said opening for supporting the rear portion of said rack, and a member mounted on said second leg for slidably supporting said receptacle, said receptacle having a plurality of parallel grooves formed therein, each of said members being received within the corresponding one of said grooves whereby said members cooperate with said grooves to guide said receptacle during sliding movement.

18. A refrigerator or the like including a liner defining a food storage compartment, a food storage receptacle within said compartment, and means including a rack disposed at the bottom of said liner for facilitating movement of said receptacle, said rack including a T-shaped frame having a first leg extending transversely of said receptacle at the forward portion of said compartment and a second leg extending rearwardly from the midpoint of said first leg, said liner having an opening in the rear wall thereof, said second leg extending through said opening for supporting the rear portion of said rack, said rack including two feet mounted on said first leg on opposite sides of said midpoint and resting on the bottom of said liner to support the forward portion of said rack, said bottom of said liner having two depressions formed therein for receiving said feet, said rack including a roller mounted adjacent each of the extremities of said first leg for slidably supporting said receptacle, said rack including a member mounted on said second leg for slidably supporting said receptacle, said receptacle having a plurality of parallel grooves formed therein, each of said rollers and said member being received within a corresponding one of said grooves whereby said rollers and said member cooperate with said grooves to guide said receptacle during sliding movement, each of said feet being independently adjustable for adjusting independently the height of each of said rollers whereby the height of each side of the forward portion of said receptacle may be varied.

RICHARD J. CARBARY.

References Cited in the file of this patent

UNITED STATES PATENTS

| Number | Name | Date |
|---|---|---|
| 499,672 | Godfrey | June 13, 1893 |
| 1,292,946 | Yawman | Jan. 28, 1919 |
| 1,851,855 | Lindemann | Mar. 29, 1932 |
| 1,940,047 | Cutler | Dec. 19, 1933 |
| 1,943,939 | Hoffstetter | Jan. 16, 1934 |
| 2,074,371 | Cummings | Mar. 23, 1937 |
| 2,113,544 | Haley | Apr. 5, 1938 |
| 2,123,803 | Regenhardt | July 12, 1938 |
| 2,126,617 | Chase | Aug. 9, 1938 |
| 2,241,053 | Brightman | May 6, 1941 |
| 2,498,554 | Klein | Feb. 21, 1950 |
| 2,573,272 | Petkwitz | Oct. 30, 1951 |

FOREIGN PATENTS

| Number | Country | Date |
|---|---|---|
| 621,007 | France | May 4, 1927 |